United States Patent [19]
Gunderman et al.

[11] 3,819,342
[45] June 25, 1974

[54] TRANSPARENT CANDLE
[75] Inventors: Anthony J. Gunderman, Monroe, N.Y.; Richard D. Forshay, Wyckoff, N.J.
[73] Assignee: Avon Products, Inc., Suffern, N.Y.
[22] Filed: Oct. 16, 1972
[21] Appl. No.: 297,614

Related U.S. Application Data
[63] Continuation of Ser. No. 128,501, March 26, 1971, abandoned.

[52] U.S. Cl. ................................. 44/7.5, 431/288
[51] Int. Cl. ........................................... C10l 5/00
[58] Field of Search ............... 44/7.5; 431/288; 260/404.5

[56] References Cited
UNITED STATES PATENTS
2,551,574  5/1951  Fredericks ........................ 44/7.5
3,615,289  10/1971  Felton ............................. 44/7.5
3,645,705  2/1972  Miller et al. ...................... 44/7.5

*Primary Examiner*—C. F. Dees
*Attorney, Agent, or Firm*—Pennie & Edmonds

[57] ABSTRACT

A transparent candle composition comprising a thermoplastic polyamide resin and a flammable solvent therefor capable of solubilizing said resin at a temperature below about 212°F. and of forming with said resin a transparent gel-type structure, said solvent being selected from the group consisting of unsaturated fatty acids, unsaturated fatty alcohols, saturated fatty alcohols, esters of fatty acids with polyhydric alcohols and glycerol, and mixtures thereof, and being present in an amount sufficient to gel the resin.

10 Claims, No Drawings

TRANSPARENT CANDLE

This is a continuation, of application Ser. No. 128,501, filed Mar. 26, 1971 which is now abandoned.

BACKGROUND OF THE INVENTION

It has long been desired to have transparent candles which will maintain their transparency during storage but which, more importantly, will not darken or discolor during use and which will burn uniformly. Transparent candles now in use are not stable either in storage or during use. Specifically, they tend to lose their transparency and become cloudy or opaque upon normal storage and, further, when lit for use, the heat of the burning wick is sufficient to cause the candle to darken, thereby losing its transparency. A variety of materials have been used in attempts to overcome this problem but none has been completely successful, particularly with regard to darkening of the candle during use. This darkening and discoloration has greatly militated against the use of such candles, since at the present day candles are mainly desired for their highly ornamental appearance.

SUMMARY OF THE INVENTION

Transparent candle compositions have now been found which will retain their transparency during storage and, more importantly, will not darken, discolor or burn unevenly when in use.

Briefly stated, the present invention comprises a transparent candle composition comprising a thermoplastic polyamide resin and a flammable solvent therefor capable of solubilizing said resin at a temperature below about 212°F. and of forming with said resin a transparent gel-type structure, said solvent being selected from the group consisting of unsaturated fatty acids, unsaturated fatty alcohols, saturated fatty alcohols, esters of fatty acids with polyhydric alcohols and glycerol, and mixtures thereof, and being present in an amount sufficient to gel the resin.

DETAILED DESCRIPTION

In accordance with the present invention, the two essential components are the polyamide resin and the solvent. Other materials are preferably added for most suitable performance. Thus, for example, antiflaring compounds can be used if it is found that the particular solvent desired for use tends to flare upon burning. In like manner, coloring agents can be used to give any desired color to the transparent candle and perfumes can be added so as to emit a fragrance upon burning of the candle. In some cases where even clarity is desired, certain short-chain alcoholic compounds can be added. While, as noted, these additional materials can be used in the formulations, they are not essential as are the polyamide and solvent.

As to the thermoplastic polyamide resin, it is preferably one formed by the reaction of an aliphatic polycarboxylic acid with a di- or polyamine. Most preferred are the reaction products of dimerized linoleic acid with di- or polyamines. Such resins are commercially available under the trade name "VERSAMID." These resins have an average molecular weight of between 2,000 to 10,000 and are described in great detail in U.S. Pat. No. 2,379,413 and 2,450,940. Examples of suitable "VERSAMID" resins that can be used are "VERSAMID" resins 900, 930, 940, 950, 1635, 710, 711 and 725. Of these, "VERSAMID" 1635 is preferred.

With respect to the flammable solvents, those preferred are the unsaturated fatty alcohols, preferably $C_{10}$–$C_{22}$, such as oleyl alcohol, linolenyl alcohol, palmitoleyl alcohol, linoleyl alcohol, ricinoleyl alcohol, mixtures thereof, and the like. Also suitable are saturated fatty alcohols, unsaturated fatty acids, and esters of fatty acids with dihydric alcohols and glycerol. With respect to the saturated fatty alcohols, these are preferably $C_6$–$C_{14}$ alcohols, such as decanol, dodecanol, hexanol, heptanol, octanol, nonanol and tetradecyl alcohol. The unsaturated fatty acids are most suitably $C_{10}$–$C_{22}$ acids such as ricinoleic, linoleic, oleic, linolenic, erucic, decylenic, dodecylenic and palmitoleic. Lastly, with respect to the esters of fatty acids, the fatty acid used preferably is a $C_6$–$C_{18}$ fatty acid and the polyhydric alcohol used is preferably ethylene or propylene glycol. Suitably the glyceride derived from naturally occurring oils can be used, or the oil itself. Thus, castor oil, which is basically the glyceride of ricinoleic acid, can be used, as can fatty acid glycerides derived from cocoanut oil. Other suitable members of this group of esters are propylene glycol monolaurate, propylene glycol stearate, propylene glycol myristate, and the like esters. In addition to such glycol monoesters, propylene glycol esters derived from oil such as cocoanut oil also can be used. These fatty compounds are flammable and capable of solubilizing the resins noted at temperatures below about 212°F. While some solvents are preferably more suitable for use with a particular resin, they all have the ability of forming with said resins a transparent gel-type structure.

As to proportions, there is used for each part by weight of resin that amount of solvent sufficient to form a gel of the strength desired. Normally this requires from about 0.5 to 10 parts by weight of the solvent. The particular ratio used will depend upon the resin-solvent combination used and the solubility of the resin and the solvent. While ranges outside of those set forth can be utilized, for optimum performance the ratio set forth is most suitable. For optimum performance, the total candle composition should contain from about 5 to 35 parts by weight of the polyamide resin. A preferred composition is one utilizing such range of resin with an equivalent amount of oleyl alcohol.

The candle compositions are formed by admixing the resin and solvent in the proportions noted, which admixture will form into a gel. It is understood, of course, that a standard candle wick is inserted into the mixture prior to gelling and will be set in place upon gelling of the composition. Additional materials such as coloring matter, antiflaring compounds, perfumes, clarifying agents can be added for their usual purposes. With respect to antiflaring compounds, those most suitably used are stearic acid and the esters thereof, such as isopropyl isostearate, butyl stearate, hexadecyl stearate, isostearyl stearate, and mixtures thereof. It has been found also that certain of the solvents set forth above, such as dodecanol laurate and propylene glycol monolaurate, in addition to solubilizing the resin, also effectively inhibit flaring. Mineral oil can also be used for this purpose as well as certain paraffin distillation fractions sold under the trade name "ISOPAR." With respect to materials which can clarify the composition, these can be glycerine, $C_2$–$C_6$ glycols, and $C_1$–$C_4$ alcohols. The antiflaring compounds can be used in an amount from about 15 to 85 parts by weight for each 100 parts by weight of the composition. With respect to clarifying agents, these can be used from about 0.5 to 10 parts for each 100 parts by weight of the composition.

The invention will be further described in connection with the following examples which are set forth for purposes of illustration only and in which proportions are in parts by weight unless specifically stated to the contrary.

In each of the following examples the candles were formed by admixing the ingredients listed in containers having the shape desired for the final gelled composition and candle wicks placed therein. After the composition has completely gelled, some candles from each batch were tested immediately to observe their transparency and resistance to darkening when lit, and others were stored to determine their stability as to transparency upon aging and then tested after storage for resistance to darkening and opacity when lit.

EXAMPLE 1

|  | A | B | C |
|---|---|---|---|
| Versamid 1635 | 10.00 | 10.00 | 10.00 |
| Mineral Oil | 27.50 | 27.50 | 27.50 |
| Hexadecyl Stearate | 25.00 | 25.00 | 25.00 |
| Perfume Oil | 5.00 | 5.00 | 5.00 |
| Isopropyl Alcohol | 5.00 | 5.00 | 5.00 |
| Oleyl Alcohol | 27.50 | — | — |
| Oleic Acid | — | 27.50 | — |
| Propylene Glycol Monolaurate | — | — | 27.50 |
|  | 100.00 | 100.00 | 100.00 |

EXAMPLE 2

|  | A | B |
|---|---|---|
| Versamid 1635 | 10.00 | 10.00 |
| Oleyl Alcohol | 25.00 | 25.00 |
| Mineral Oil | 10.00 | 10.00 |
| Neobee M-O (Fractionated Cocoanut Oil Fatty Acid Triglyceride) | 10.00 | — |
| Propylene Glycol | 5.00 | 5.00 |
| Hexadecyl Stearate | 25.00 | 25.00 |
| Neobee M-5 (Cocoanut Oil derived fatty acid Triglyceride in which the fatty acids are 70% caprylic and 30% capric) | — | 10.00 |
| Perfume | 5.00 | 5.00 |
| Castor Oil | 10.00 | 10.00 |
|  | 100.00 | 100.00 |

EXAMPLE 3

|  | A | B | C | D | E |
|---|---|---|---|---|---|
| Versamid 1635 | 10.00 | 10.00 | 10.00 | 11.11 | 10.00 |
| Decanol | 27.50 | 10.00 | 5.00 | 11.12 | — |
| Oleyl Alcohol | — | 10.00 | 10.00 | 11.12 | 30.00 |
| Isopar (Paraffin Distillation Fraction) | — | — | 10.00 | — | — |
| Neobee M-20 (Propylene glycol diester of Cocoanut Oil Fatty Acids) | 27.50 | 40.00 | 25.00 | 55.55 | 20.00 |
| Hexadecyl Stearate | 25.00 | 20.00 | 30.00 | — | — |
| Perfume Oil | 5.00 | 5.00 | 5.00 | 5.55 | 5.00 |
| Mineral Oil | — | — | — | — | — |
| Prop. Glycol | — | — | 5.00 | 5.55 | 5.00 |
| Anhydrous Alc. | 5.00 | 5.00 | — | — | — |
| Castor Oil | — | — | — | — | 30.00 |
|  | 100.00 | 100.00 | 100.00 | 100.00 | 100.00 |

EXAMPLE 4

|  | A | B | C | D | E |
|---|---|---|---|---|---|
| Versamid 1635 | 10.00 | 10.00 | 10.00 | 10.00 | 10.00 |
| Oleyl Alcohol | — | 25.00 | 25.00 | 25.00 | 25.00 |
| Castor Oil | 10.00 | 10.00 | 10.00 | 10.00 | 10.00 |
| Mineral Oil | 10.00 | 17.25 | 11.00 | 11.00 | 11.00 |
| Neobee M-20 | 10.00 | 17.25 | 11.00 | 11.00 | 11.00 |
| Hexadecyl Stearate | 25.00 | — | — | — | — |
| Prop. Glycol | 2.50 | 2.50 | 5.00 | 5.00 | 5.00 |
| Perfume | 5.00 | 3.00 | 3.00 | 3.00 | 3.00 |
| Oleic Acid | 25.00 | — | — | — | — |
| Oleyl Oleate | — | 12.50 | — | — | — |
| Isostearic Acid | — | — | 25.00 | — | — |
| Myristyl Myristate | — | — | — | 25.00 | — |
| Isopropyl Isostearate | — | — | — | — | 25.00 |
| Absolute Alcohol | 2.50 | 2.50 | — | — | — |
|  | 100.00 | 100.00 | 100.00 | 100.00 | 100.00 |

EXAMPLE 5

|  | A | B | C |
|---|---|---|---|
| Versamid 1635 | 15.00 | 15.00 | 15.00 |
| Oleyl Alcohol | 20.00 | 25.00 | 32.50 |
| Hexadecyl Stearate | 20.00 | 20.00 | 20.00 |
| Neobee M-20 | 25.00 | 10.00 | 10.00 |
| Propylene Glycol | 5.00 | — | 5.00 |
| Perfume | 5.00 | 5.00 | 5.00 |
| Caster Oil | — | 10.00 | — |
| Dodecanol | 10.00 | — | — |
| Mineral Oil | — | 10.00 | 10.00 |
| Glycerin | — | 5.00 | — |
|  | 100.00 | 100.00 | 100.00 |

Each of the candle compositions of the foregoing Examples remained transparent even upon prolonged storage and, more importantly, did not lose such transparency or darken when lit.

EXAMPLE 6

| | |
|---|---|
| Versamid 711 | 5.00 |
| Oleyl Alcohol | 27.50 |
| Neobee M-20 | 32.50 |
| Hexadecyl Stearate | 25.00 |
| Isopropyl Alcohol | 5.00 |
| Perfume | 5.00 |
| | 100.00 |

A transparent candle is obtained which does not darken or become opaque during use.

EXAMPLE 7

| | |
|---|---|
| Versamid 1635 | 34.00 |
| Oleyl Alcohol | 53.00 |
| Butyl Stearate | 4.50 |
| Isostearic Acid | 3.50 |
| Perfume | 5.00 |
| | 100.00 |

A transparent candle is obtained which retains its transparency and does not appreciably darken during use.

EXAMPLE 8

A series of candles are made using the formulation and procedure of Example 1A except that for the "Versamid 1635" used therein there is substituted, separately and in turn, an equal amount of one of the following: "Versamid 900," "Versamid 930," "Versamid 940," "Versamid 950," "Versamid 710" and "Versamid 711." In each case suitable transparent candles are formed.

EXAMPLE 9

A series of candles are made using the formulation and procedure of Example 1A except that for the oleyl alcohol used therein there is substituted, separately and in turn, an equal amount of one of the following: linolenyl alcohol, palmitoleyl alcohol, linoleyl alcohol, ricinoleyl alcohol, tetradecyl alcohol, nonanol, heptanol, hexanol, ricinoleic acid, linoleic acid, linolenic acid, erucic acid, decylenic acid, dodecylenic acid, palmitoleic acid, propylene glycol stearate, propylene glycol myristate, glycerol monostearate, glycerol monooleate, glycerol monolaurate, and glycerol trioleate. In each case suitable transparent candles are obtained.

It will be understood that it is intended to cover all changes and modifications of the examples of the invention herein chosen for the purpose of illustration which do not constitute departures from the spirit and scope of the invention.

What is claimed is:

1. A transparent candle composition comprising a thermoplastic polyamide resin formed by the reaction of an aliphatic polycarboxylic acid with a polyamine and a flammable solvent therefor capable of solubilizing said resin at a temperature below about 212°F. and of forming with said resin a transparent gel-type structure, said solvent being selected from the group consisting of unsaturated fatty acids and fatty alcohols, saturated fatty alcohols, esters of fatty acids with polyhydric alcohols and mixtures thereof and being present in an amount sufficient to gel the resin.

2. The composition of claim 1 wherein for each part by weight of resin there is from about 0.5 to 10 parts by weight solvent.

3. The composition of claim 2 wherein the solvent is an unsaturated $C_{10}$–$C_{22}$ fatty alcohol.

4. The composition of claim 2 wherein the solvent is a $C_6$–$C_{14}$ saturated fatty alcohol.

5. The composition of claim 2 wherein the solvent is an unsaturated $C_{10}$–$C_{22}$ fatty acid.

6. The composition of claim 2 wherein the solvent is an ester of a $C_6$–$C_{18}$ fatty acid with a dihydric alcohol or glycerol.

7. The composition of claim 2 wherein the alcohol is oleyl alcohol and the composition includes an antiflaring compound.

8. The composition of claim 2 wherein the composition contains, for each 100 parts by weight thereof, from about 5 to 35 parts by weight of polyamide resin.

9. The composition of claim 8 including a clarifying agent selected from the group consisting of glycerine, $C_2$–$C_6$ glycols, and $C_1$–$C_4$ alcohols.

10. A transparent candle comprising a candle wick embedded in a gel, said gel formed by admixing, for each 100 parts by weight of gel, from about 5 to 35 parts by weight of a thermoplastic polyamide resin formed by the reaction of an aliphatic polycarboxylic acid with a polyamine, from about 0.5 to about 10 parts by weight for each part by weight resin, of a flammable solvent for said resin selected from the group consisting of an unsaturated $C_{10}$–$C_{22}$ fatty alcohol, a saturated $C_6$–$C_{14}$ fatty alcohol, an unsaturated $C_{10}$–$C_{22}$ fatty acid, an ester of a $C_6$–$C_{18}$ fatty acid with a polyhydric alcohol of glycerol, and mixtures thereof.

* * * * *